(12) United States Patent
Schell et al.

(10) Patent No.: US 8,240,785 B2
(45) Date of Patent: Aug. 14, 2012

(54) CONTROL BOX ARRANGEMENT

(75) Inventors: Michael Schell, Dillenburg (DE); Tobias Becker, Ehringshausen (DE); René Stenfert, Eijsselstein (NL)

(73) Assignee: Rittal GmbH & Co. KG, Herborn (DE)

( * ) Notice: Subject to any disclaimer, the term of this patent is extended or adjusted under 35 U.S.C. 154(b) by 461 days.

(21) Appl. No.: 12/448,228

(22) PCT Filed: Nov. 29, 2007

(86) PCT No.: PCT/EP2007/010347
§ 371 (c)(1),
(2), (4) Date: Jun. 12, 2009

(87) PCT Pub. No.: WO2008/071309
PCT Pub. Date: Jun. 19, 2008

(65) Prior Publication Data
US 2010/0213803 A1 Aug. 26, 2010

(30) Foreign Application Priority Data
Dec. 12, 2006 (DE) .......................... 10 2006 058 779

(51) Int. Cl.
*A47G 29/00* (2006.01)
(52) U.S. Cl. ................................. 312/265.3; 312/223.6
(58) Field of Classification Search .... 312/265.1–265.5, 312/223.6, 107–108; 211/26; 361/829
See application file for complete search history.

(56) References Cited

U.S. PATENT DOCUMENTS

| | | | | |
|---|---|---|---|---|
| 1,729,475 A | * | 9/1929 | Brainard et al. | 312/265.2 |
| 2,319,415 A | * | 5/1943 | Lightfoot | 361/610 |
| 3,142,003 A | * | 7/1964 | Olashaw | 361/608 |
| 3,170,092 A | * | 2/1965 | Adams et al. | 361/608 |
| 3,240,862 A | * | 3/1966 | Merkl et al. | 174/371 |
| 3,482,143 A | * | 12/1969 | Bugni et al. | 361/608 |
| 3,710,198 A | | 1/1973 | Burton | |
| 4,180,846 A | * | 12/1979 | Wilson et al. | 361/643 |
| 4,265,501 A | * | 5/1981 | Halliburton | 312/108 |
| 4,305,114 A | * | 12/1981 | Takagi et al. | 361/614 |
| 4,528,614 A | * | 7/1985 | Shariff et al. | 361/678 |
| 5,305,187 A | * | 4/1994 | Umezu et al. | 361/784 |

(Continued)

FOREIGN PATENT DOCUMENTS

DE 1 515 561 7/1969

(Continued)

OTHER PUBLICATIONS

Co-Pending U.S. Appl. No. 12/311,963, filed Apr. 20, 2009; inventors Michael Schell et al.; title Control Box Arrangement.

(Continued)

*Primary Examiner* — Hanh V Tran
(74) *Attorney, Agent, or Firm* — Pauley Petersen & Erickson (57) ABSTRACT

A control box arrangement including at least one control box which is sub-divided, or can be sub-divided, by vertical wall sections with a horizontal sub-division, into a plurality of cuboid compartments surrounded on all sides. A variable structural design of compartments, particularly functional compartments, for example for low voltage systems, is obtained by providing wall sections including lateral wall sections adapted to the same or different compartment heights, adapted rear wall sections embodied as mounting plates, and horizontal partition bottoms, in order to produce a plurality of horizontal compartments, in the form of pigeonholes, arranged one above the other.

25 Claims, 6 Drawing Sheets

U.S. PATENT DOCUMENTS

| | | | | |
|---|---|---|---|---|
| 6,021,909 A | * | 2/2000 | Tang et al. | 211/183 |
| 6,095,345 A | * | 8/2000 | Gibbons | 211/26 |
| 6,123,400 A | * | 9/2000 | Nicolai et al. | 312/265.1 |
| 6,401,940 B1 | | 6/2002 | Hartel et al. | |
| 7,182,208 B2 | * | 2/2007 | Tachibana | 211/26 |
| 2005/0127802 A1 | * | 6/2005 | Chen | 312/265.4 |

FOREIGN PATENT DOCUMENTS

| | | |
|---|---|---|
| DE | 40 13 379 C1 | 7/1991 |
| DE | 42 10 679 A1 | 10/1993 |
| DE | 10 2004 054 173 A1 | 5/2006 |
| GB | 2 305 006 A | 3/1997 |
| RU | 22036602 C2 | 5/2003 |
| WO | WO 2006/123384 A1 | 11/2006 |

OTHER PUBLICATIONS

Co-Pending U.S. Appl. No. 12/448,240, filed Jun. 20, 2009; inventors Michael Schell et al.; title Control Box Arrangement.

Co-Pending U.S. Appl. No. 12/448,236, filed Jun. 12, 2009; inventors Michael Schell et al.; title Control Box Arrangement.

* cited by examiner

CONTROL BOX ARRANGEMENT

BACKGROUND OF THE INVENTION

1. Field of the Invention

This invention relates to a control box arrangement with at least one control box, which is or can be subdivided by wall sections into a plurality of cuboid compartments that are enclosed on all sides, for which are provided vertical wall sections with a horizontal subdivision.

2. Discussion of Related Art

A control box arrangement of this type, equipped with a control box, is disclosed in German Patent Reference DE 10 2004 054 173 A1. In this known control box, in order to construct a low-voltage control box that conforms to standards, the interior is divided into a plurality of compartments that are separated from one another by vertical dividing walls, namely a device compartment for devices on the side oriented toward the user, a cable connection compartment for routing cables through, and a bus bar compartment for the supply of current by bus bars electrically connected to a distributing rail system and which supply the electrical energy to the devices in the device compartment. In this case, the dividing wall that divides the device compartment situated in the front region from the bus bar compartment situated in the rear region has a front and rear wall section between which the vertical distributing rails are situated. Horizontal dividing lines subdivide the rear and front wall sections into a plurality of segments that are of different heights in the two wall sections to make it possible to adapt to different control box heights. In the front wall section, openings are provided through which the connecting terminal tabs can be contacted with the distributing rails via a plug-in unit. No indication is given as to the extent to which there are subdividing options other than the ones disclosed, aside from the adaptation to different control box heights.

German Patent Reference DE 40 13 379 C2 discloses a control box with a frame and compartments that can be closed by compartment doors. The compartments are delimited by side wall sections that essentially correspond to the height of a compartment. The side wall sections are secured by connecting rails that are of C-shaped guide rails 31 and L-shaped base rails. A horizontal leg of the L-shaped base rail is used to accommodate horizontal dividing floors that are inserted into a gap between a leg of the C-shaped guide rail and the horizontal leg of the base rail. The connecting rails are attached to rows of fastening holes situated on the opposing inside surfaces of vertical frame legs, with the lateral legs of the C-shaped guide rails protruding into the interior. This design provides simple possibilities for assembly and arrangement, but requires relatively complex connecting rails. With this design, it is difficult to subdivide the space in the horizontal direction in order to produce a plurality of compartments situated vertically adjacent to one another.

SUMMARY OF THE INVENTION

One object of this invention is to provide a control box arrangement of the type mentioned above that enables variable spatial subdivisions of the interior of the control box arrangement in the simplest possible way.

This object is attained by characteristics taught in this specification and in the claims. To produce a plurality of horizontal compartments arranged one above the other in the form of cubbyholes, the wall sections include side wall sections, which are adapted to the same or different compartment heights, adapted rear wall sections, which are embodied in the form of mounting plates, and horizontal compartment-dividing floors.

The side wall sections, which are adapted to the compartment height, rear wall sections, and horizontal compartment-dividing floors comprise a building-block system enabling the production of various spatial divisions into desired compartments without great complexity, thus also enabling simple retrofitting. The rear wall sections embodied as mounting plates offer a wide variety of mounting possibilities, in particular for functional compartments for the installation of device components on the side oriented toward the user. This achieves a modular, flexible system, particularly for low-voltage equipment.

The heights of the side wall sections and mounting plates are matched to a spacing dimension of rows of fastening holes of vertical frame legs and/or vertical mounting rails situated in the control box arrangement facilitates the variable construction possibilities while retaining ease of assembly.

If a bus bar compartment for a main rail system is provided, which extends vertically over an entire height of the control box interior, situated on the inside behind the cubbyholes in the depth direction of the control box arrangement, then there are advantageous connection possibilities in the rear region of or near the cubbyholes for the supply of energy to device components situated in the functional compartments.

It is operationally advantageous to provide the fronts of the cubbyholes with respective compartment doors adapted to their heights.

Another embodiment that offers advantages with regard to increased safety and/or a complete overview comprises a front door that extends over all of the cubbyholes at the front, in front of the cubbyholes, each of which is possibly equipped with its own respective compartment door.

A favorable subdivision and sealing of the cubbyholes, particularly at the compartment doors, is achieved if a divider strip with a U-shaped cross section is situated in front of the front edge of the compartment-dividing floors, with an open side oriented toward the front and the free ends of its side legs situated in the same plane as the front plane of the frame legs.

In a simple assembly, the side wall sections, in their upper corner region close to the vertical edge, have bent hook elements that are oriented away from the cubbyhole interior and have downward-oriented securing protrusions that are adapted to the openings in the rows of fastening holes.

The lining up of side wall sections is simplified if in their upper edge region, the side wall sections are first bent diagonally inward and upward at an obtuse angle parallel to the edge and are then bent diagonally outward and upward. The upward-angled free end sections of the edge regions guide the lower, in particular flat, edge region of a side wall above them into the correct position as it is hung in place and then covered so that through corresponding dimensioning, the edge of the other side wall protrudes in the vertical direction, preferably behind the angled free end section.

Advantageous mounting possibilities on the side wall sections are offered by the fact that the side wall sections have a horizontal arrangement of holes, at least in their lower edge region.

The arrangement of the compartment-dividing floors and their attachment to the side wall sections are achieved if the mounting angles are provided for attaching the compartment-dividing floor along the two opposing side wall sections. The mounting angles have a vertical leg and a horizontal leg and are attached to the vertical frame legs, the vertical mounting rails, and/or the side wall sections, with the respective compartment-dividing floor fastened to the opposing horizontal legs of the mounting angles.

In a simple assembly, the mounting angles protrude beyond the inner edge of the vertical frame legs and the width of the compartment-dividing floors is at most as wide as the distance between the opposing insides of the vertical frame legs in the width direction of the control box arrangement.

The accessibility to the functional compartments and a uniquely defined mounting of the wall sections are facilitated by the vertical frame legs having a mounting plane, which is recessed in relation to the internal opening region of the control box and has rows of fastening holes to which the side wall sections are mounted.

The spatial subdivision of the control box interior, with advantageous possibilities for arranging a main rail system behind the functional compartments, is facilitated by the compartment-dividing floors extending to the mounting plates in the depth direction and the side wall sections likewise extending to the plane of the mounting plates and attached to vertical mounting rails situated there or extending in the depth direction to the rear vertical frame legs and are attached to them, optionally in their outer mounting plane.

Advantages relating to the arrangement and accessibility of distributing rails for supplying electrical energy to the functional compartments are also achieved by the compartment-dividing floors having in their rear edge region a cutout that is broken out or that can be broken out, through which the vertical distributing rails, together with a cover that prevents them from being touched, are or can be routed.

BRIEF DESCRIPTION OF THE DRAWINGS

This invention is explained in view of exemplary embodiments shown in the drawings, wherein.

DETAILED DESCRIPTION OF THE INVENTION

Figure 1:
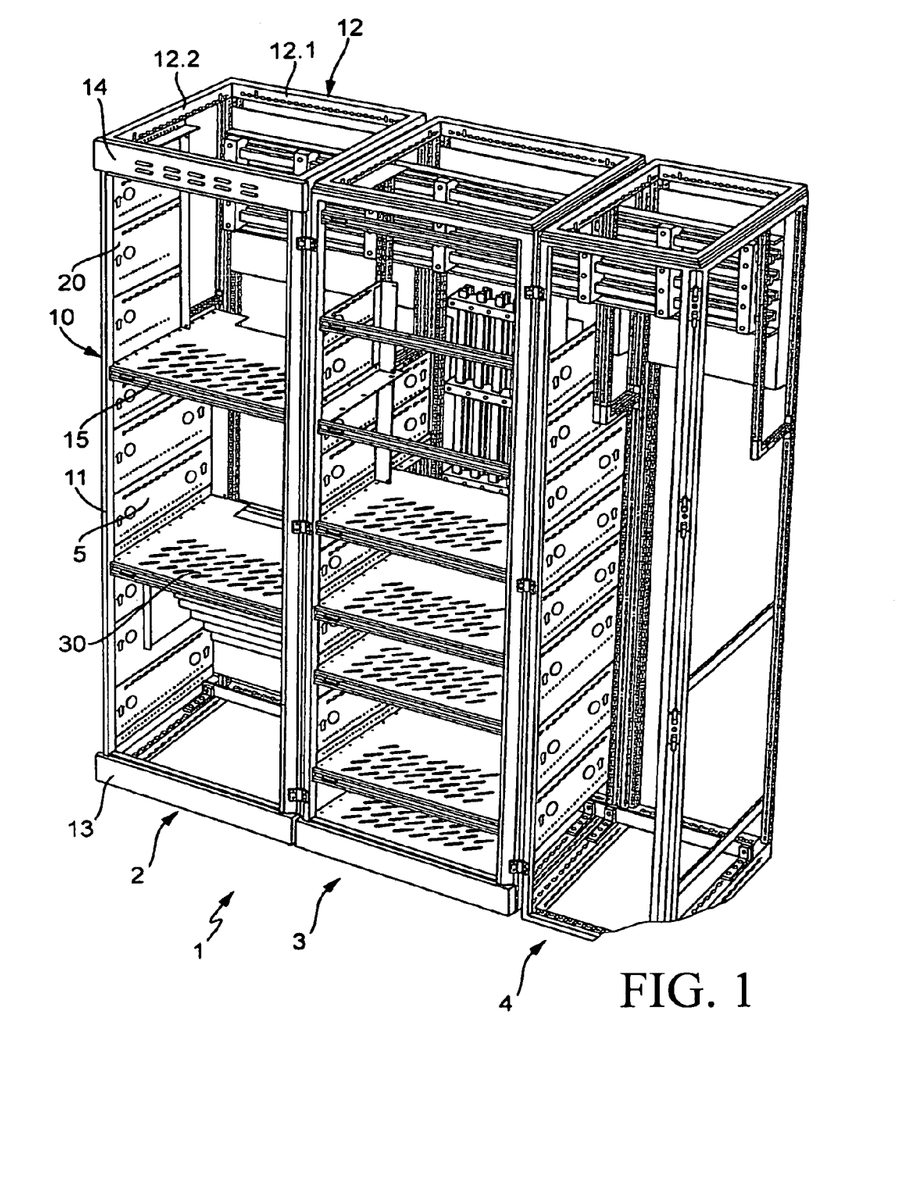
FIG. 1 is a perspective view of a control box arrangement, with doors removed and with some of the wall elements removed, which has a plurality of functional compartments.

FIG. 1 shows a control box arrangement 1 with a plurality of control boxes 2, 3, 4 situated in a row, with their respective frames next to one another. The right control box has a narrower width than the other two control boxes 2, 3 and has only one continuous inner compartment, extending from the top to the bottom, whereas the two other control boxes 2, 3 have a plurality of horizontal compartments 5 situated or positioned one above the other, embodied in the form of functional compartments of different heights. In the rear region of the control box arrangement 1, there is a main rail system with a plurality of horizontally extending conductor rails, while in the middle control box 3, there are vertical distributing rails that are connected to the main rails by electrically conductive connecting elements with adapted current-carrying properties. The distributing rails extend vertically through a plurality of functional compartments and are mounted by corresponding bus bar holders to the front surface of back wall sections in the form of mounting plates 40 associated with the functional compartments and are accessible from the interior of the functional compartments. Appropriate device adapters for connecting device components are mounted on the distributing rails in a conductive fashion. Spaces between the device adapters are sealed by insulating covers so that they cannot be touched from the interior of the functional compartments. The distributing rails extend through a plurality of functional compartments situated one above the other and corresponding cutouts 32, which are adapted to the dimensions of the distributing rails with the covers, are provided in the rear region of horizontal compartment-dividing floors 30, such as shown also in FIGS. 6 and 14.

Figure 12:
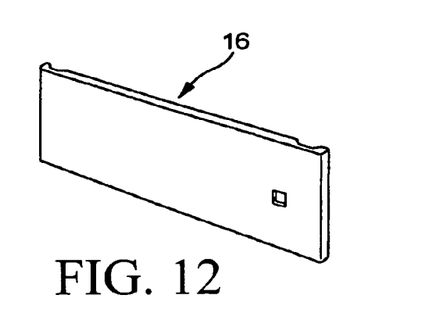
FIG. 12 is a perspective view of a compartment door.

FIG. 1 also shows that the control boxes 2, 3, 4 have frames 10 with four vertical frame legs 11 situated in the corner regions and have top frames with frame legs 12.1 and 12.2 extending in the width direction and the depth direction, respectively. The control boxes 2, 3, 4 each has a respective base 13. Divider strips 15, which are U-shaped in cross section and whose open sides are oriented toward the front, are situated in the region of the front edge of the compartment-dividing floors 30. The free ends of the side legs 15.1, 15.3 are flush with the front edges of the vertical frame legs 11 and the front plane of the frame 10. An upper front panel 14 is attached to the front surface of the top frame 12. In order to close the front side of the control boxes, either a front door that extends all the way from top to bottom is provided or compartment doors 16 that are associated with the respective functional compartments and adapted to them in height, such as shown in FIG. 12, are provided, which are supported on respective hinge parts 16.1 mounted on the vertical frame legs 11 in articulating fashion by complementary hinge parts and can each be separately closed by respective associated closing parts 16.2 situated on the opposite vertical frame legs 11.

The horizontal compartments 5 situated one above the other and embodied in the form of functional compartments are delimited laterally by side wall sections 20 adapted to the height of the functional compartments and the front vertical edge regions of the side wall sections 20 are each mounted onto the associated vertical frame leg 11 while their rear vertical edge regions are each mounted either to the respective rear vertical frame legs 11 or to respective vertical mounting legs that are situated in the plane of the rear wall sections of the functional compartments. In addition to the side wall sections 20 laterally delimiting the functional compartments, the associated control boxes 2 and 4 are also closed by continuous outer side walls, and are also closed at the back and top of the control box arrangement 1.

Figure 9:
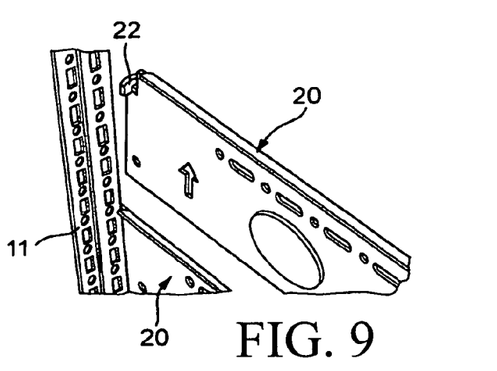
FIG. 9 is a perspective view of a side wall region of a control box, with a detached side wall section.
Figure 10:
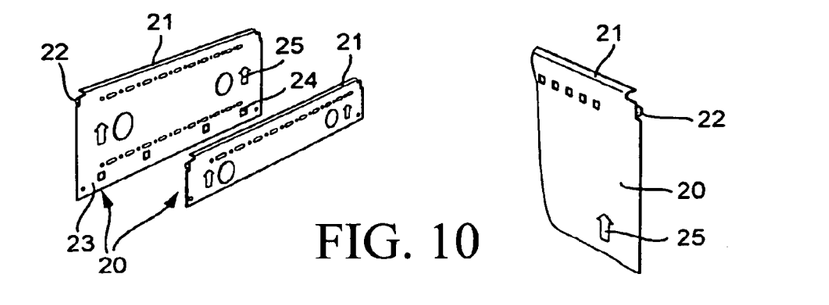
FIG. 10 is a perspective view of two side wall sections of different heights and an enlarged detail of the corner region of a side wall section.
Figure 11:
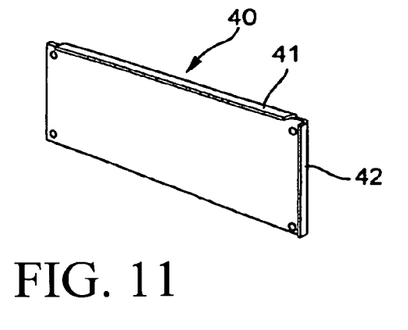
FIG. 11 is a perspective view of a component-mounting plate.

In their upper edge region, the side walls 20 are first bent inward and upward at an obtuse angle with respect to the functional compartment and are then bent diagonally outward and upward again, parallel to the upper edge, as is shown in FIGS. 9 and 10. A bent hook element 22 protruding outward from the plane of the side wall section 20 is situated in the upper corner region. The hook element 22 is adapted to the length of vertically oriented oblong holes in the associated vertical frame leg 11 or mounting leg and can be hooked into it with a downward-protruding securing protrusion. Preferably, the vertical frame legs 11 have an inner lateral mounting plane bordering the front frame region of the frame 10 and, on the side oriented away from the front surface and offset laterally toward the outside, have an outer lateral mounting plane likewise oriented toward the inner side of the frame leg 11. Both the inner and outer mounting planes of the vertical frame legs 11 have rows of fastening holes. By the hook elements, the side wall sections 20 are hooked preferably into the outer, laterally recessed mounting plane. The vertical mounting leg also has a corresponding row of fastening holes in the corresponding plane. In addition to the hook elements 22, the lower, front and rear corner regions of the side wall sections 20 have fastening holes that coincide with fastening openings in the vertical frame legs 11 and the related vertical mounting legs and permit a screw connection for securing purposes. In addition, the side wall sections 20 have a horizontally extending arrangement of holes 24 in their lower edge region 23 and possibly also in their upper edge region 21 or upper section. To assure correct orientation, with the upper edge, which is bent in the described way, pointing toward the top, the side wall sections 20 each has orientation marks 25 in the form of arrows pointing upward. In addition, they have an opening, which is either covered by a removable plate or can be broken open along a perforation, to provide access from the side, such as into a cable space situated next to it. The heights of the side wall sections 20 are preferably adapted to the height of a functional compartment, preferably in a certain spacing dimension, in particular in accordance with integral multiples of height units HE. Thus, the side wall sections 20 can have different heights in order to form functional compartments of different heights.

Accordingly, the heights of the component-mounting plates 40 and the compartment doors 16 are also adapted to the height of functional compartments in a particular spacing pattern, in particular in accordance with integral multiples of height units, thus yielding a kind of building block system for constructing desired functional compartments that can be also arranged at different heights of the control box interior in accordance with the rows of holes and their spacing patterns in the vertical frame legs 11 and vertical mounting legs.

Figure 13:
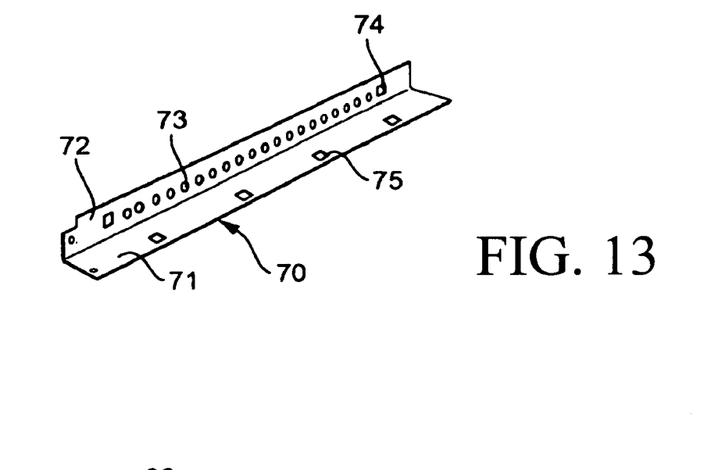
FIG. 13 is a perspective view of a mounting angle.
Figure 14:
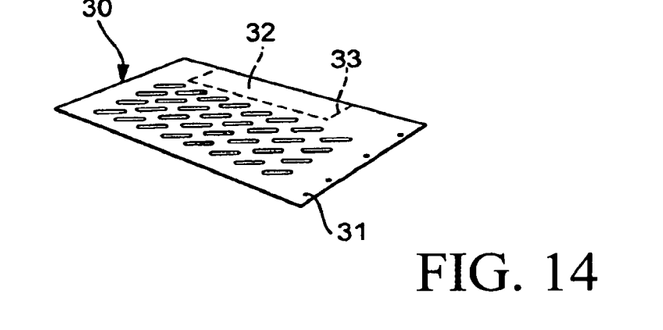
FIG. 14 is a perspective view of a compartment-dividing floor.

Mounting angles 70, which can be attached laterally to the side wall sections 20 and/or to the vertical frame legs 11 or the vertical mounting rails, are provided for arranging the compartment-dividing floors 30. The mounting angles 70 extend with a vertical leg 72 along the associated side wall section 20 and protrude with their horizontal leg 71 toward the interior of the control box. The top surfaces of two opposing horizontal legs 71 accommodate a compartment-dividing floor 30, which can be connected to them by elements, in particular screws, which engage in openings in a row of holes 73 or an arrangement of holes 31, such as shown in FIGS. 13 and 14. The horizontal legs 71 protrude beyond the inner mounting plane of the vertical frame legs 11 into the interior and the dimension of the compartment-dividing floor 30 in the width direction is at most as wide as the distance between two opposing inner mounting planes so that the compartment-dividing floor 30 can be easily inserted into the control box interior and fastened to the mounting angles 70, with the cutout 32 also properly positioned in relation to the distributing rails.

Figure 2A:
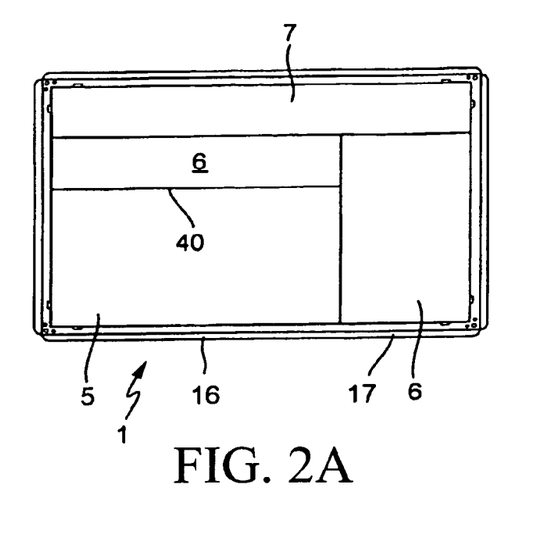
FIGS. 2A and 2B each shows a control box arrangement with a control box, one in a top view of a plurality of compartments formed by vertical dividing walls and another in a front view of a plurality of horizontally divided compartments having compartment doors.
Figure 2B:
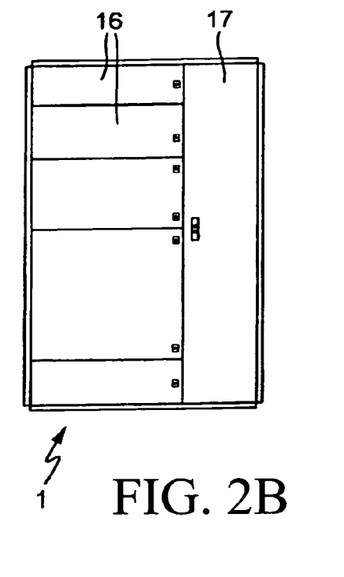

FIGS. 2A and 2B show possible ways to divide the space inside a control box, first horizontally by vertical dividing walls and then vertically by the horizontal compartment-dividing floors 30.

Figure 3:
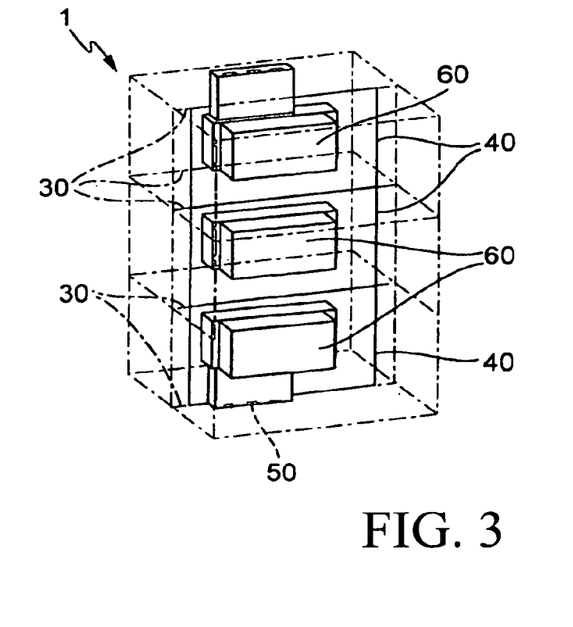
FIG. 3 is a perspective, transparent depiction of a control box with horizontally divided compartments and a distributing rail system to which device components are connected.
Figure 4:
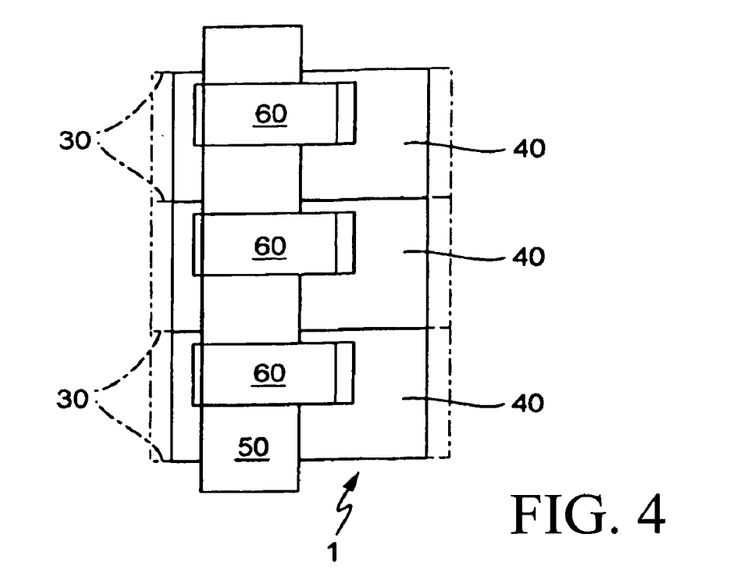
FIG. 4 is a front view of the embodiment according to FIG. 3.
Figure 5:
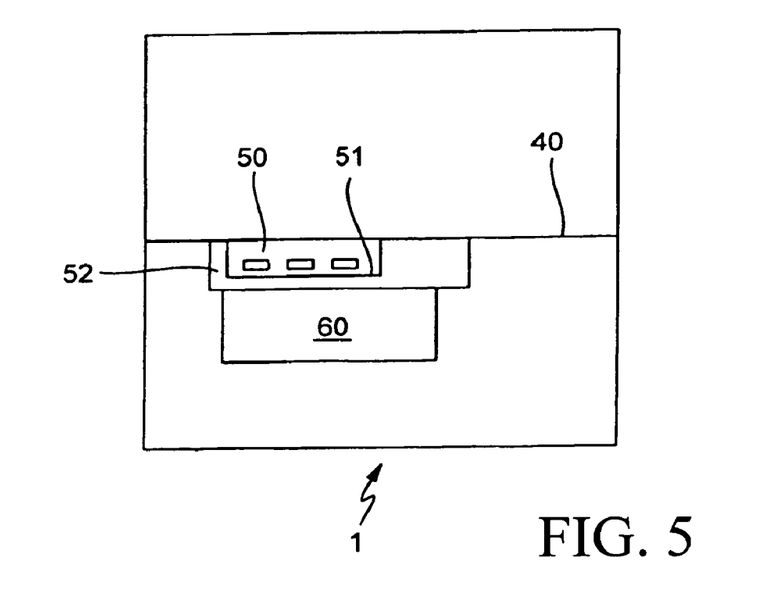
FIG. 5 is a top view of the embodiment according to FIG. 3.
Figure 6:
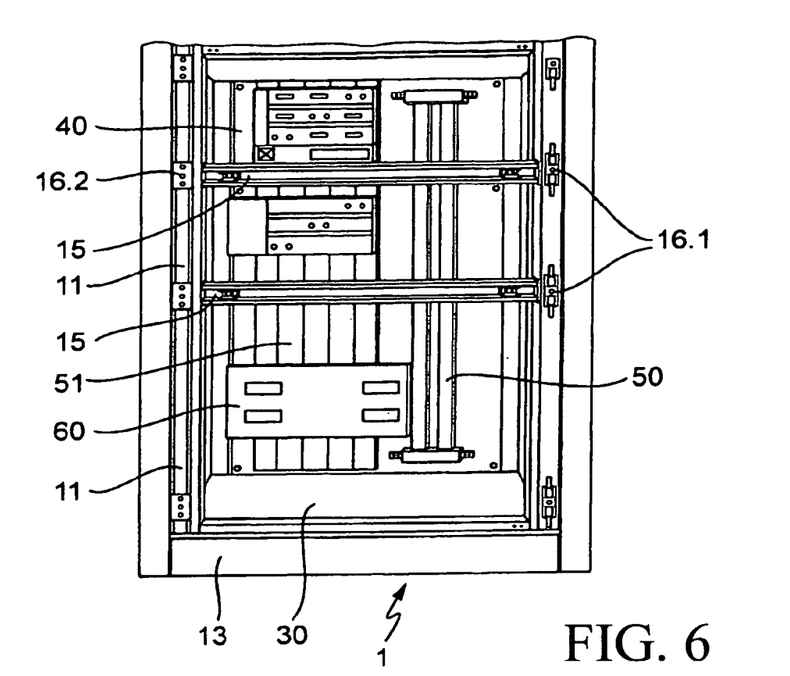
FIG. 6 is a perspective front view of a detail of a control box that has a plurality of horizontally divided functional compartments and has a distributing rail system.
Figure 7:
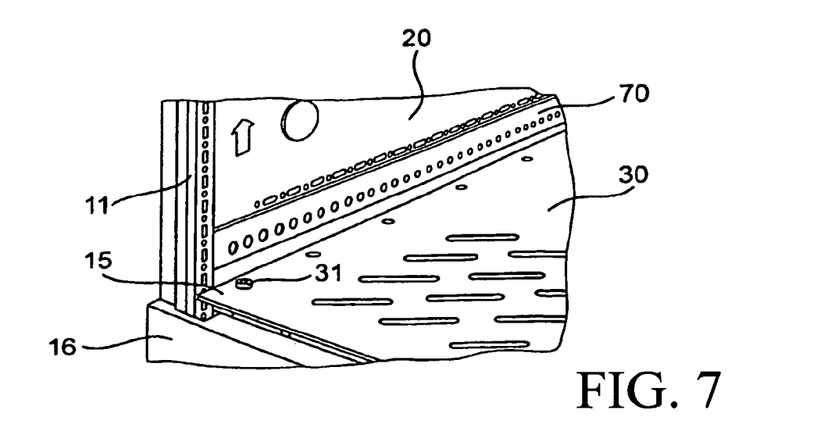
FIG. 7 is a perspective view of a detail of a control box in a corner region of a compartment that is in the form of a functional compartment.
Figure 8:
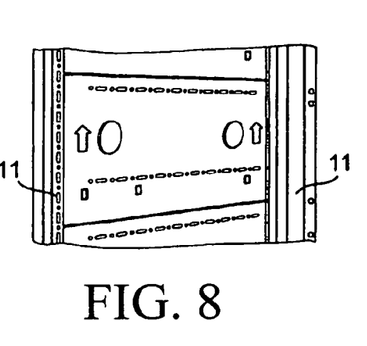
FIG. 8 is a view from the inside of a side wall region of a control box, with lateral wall sections.

FIGS. 3, 4, and 5 show the distributing rail arrangement 50 with the bus bar cover 51 and device adapters 52 mounted on the distributing rail arrangement 50, as well as switching equipment components 60 connected to them. FIG. 6 also shows the arrangement of distributing rails 50 extending through a plurality of functional compartments and their routing through the cutouts 32 in the rear region of the compartment-dividing floors 30. As shown in FIG. 14, a perforation 33 can be provided in the rear edge region of the compartment-dividing floor 30, thus permitting the cutout 32 to be simply broken open when needed. The cutout 32 is open to the rear edge of the compartment-dividing floor 30 so that the compartment-dividing floor 30 can also easily be subsequently placed at any height in the control box interior and can also be removed again, without requiring removal of the arrangement of distributing rails 50.

As shown in FIG. 13, the mounting angle 70 can be hooked onto or attached to the arrangement of holes 24 in the associated side wall section by fastening holes 74, 75 and possibly by hook-shaped tabs that are bent sideways on the rear surface oriented away from the interior.

Figure 15:
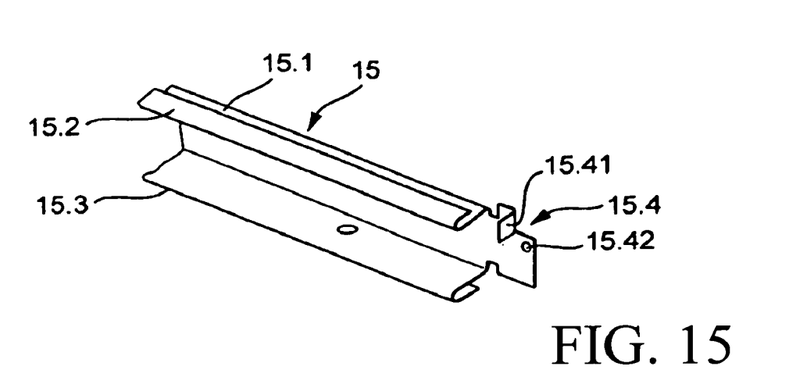
FIG. 15 is a perspective view of a section of a divider strip.

As shown in FIG. 15, the main strip piece 15.2 of each U-shaped divider strip 15 has lateral fastening sections 15.4 extending from it at both ends, which engage behind shoulders on the rear surface of the vertical frame legs 11 in the installed position and are fastened by screws inserted through fastening openings from the rear. In addition, open regions and bent-back securing elements 15.41 can be provided in the corner region of the fastening sections 15.4.

The above-described modular design for the compartments inside the control box permits variable arrangements to be produced with simple assembly, while also satisfying the high functional reliability standards of the type required for low-voltage equipment.

The invention claimed is:

1. A control box arrangement comprising:
   at least one control box (2, 3, 4) having an interior subdivided or subdividable into a plurality of cuboid compartments (5), the at least one control box including a plurality of vertical frame legs (11) enclosed on all sides by vertical wall sections and including horizontal compartment-dividing floors (30) forming the plurality of cuboid compartments arranged one above the other;
   the vertical frame legs having a mounting plane recessed with respect to an internal opening region of the control box and each including rows of fastening holes to which the vertical wall sections are mounted; and
   the vertical wall sections including side wall sections (20) and rear wall sections embodied as mounting plates (40), wherein heights of the side wall sections and the mounting plates are matched to a spacing dimension of rows of fastening holes of the vertical frame legs or vertical mounting rails positioned in the control box arrangement.

2. The control box arrangement as recited in claim 1, wherein a bus bar compartment for a main rail system extends vertically over an entire height of the control box interior, positioned inside behind the compartments (5) in a depth direction of the control box arrangement.

3. The control box arrangement as recited in claim 2, wherein fronts of the compartments (5) have respective compartment doors (16) adapted to heights of the fronts.

4. The control box arrangement as recited in claim 3, wherein a front door that extends over all of the compartments (5) is in front of the compartments (5), each of which can have a respective compartment door (16).

5. The control box arrangement as recited in claim 4, wherein a divider strip (15) with a U-shaped cross section is positioned in front of the front edge of the compartment-dividing floors (30), with an open side oriented toward the front and free ends of side legs positioned in a same plane as a front plane of the frame legs (11).

6. The control box arrangement as recited in claim 5, wherein the side wall sections (20) in an upper corner region close to a vertical edge has bent hook elements (32) oriented away from the compartment interior and have downward-oriented securing protrusions adapted to openings in the rows of fastening holes.

7. The control box arrangement as recited in claim 6, wherein in an upper edge region each of the side wall sections (20) is first bent diagonally inward and upward at an obtuse angle parallel to an edge and are then bent diagonally outward and upward.

8. The control box arrangement as recited in claim 7, wherein the side wall sections (20) have a horizontal arrangement of holes at least in a lower edge region.

9. The control box arrangement as recited in claim 8, wherein mounting angles (70) attach the compartment-dividing floor (30) along the side wall sections (20), the mounting angles have a vertical leg (71) and a horizontal leg (72) and are attached to the vertical frame legs (11), the vertical mounting rails and/or the side wall sections (20) with a respective compartment-dividing floor is fastened to the opposing horizontal legs (72) of the mounting angles (70).

10. The control box arrangement as recited in claim 9, wherein the mounting angles (70) protrude beyond the inner edge of the vertical frame legs (11) and a width of the compartment-dividing floors (30) is at most as wide as a distance between the opposing vertical frame legs (11) in a width direction of the control box arrangement.

11. The control box arrangement as recited in claim 10, wherein the compartment-dividing floors (30) extend in the depth direction to the mounting plates (40) and the side wall sections (20) extend to the plane of the mounting plates (40) and are attached to vertical mounting rails or extend in the depth direction to and are attached to the rear vertical frame legs.

12. The control box arrangement as recited in claim 11, wherein the compartment-dividing floors (30) have in a rear edge region a cutout (32) that is broken out or can be broken out, through which the vertical distributing rails with a cover that prevents them from being touched are routed.

13. The control box arrangement as recited in claim 1, wherein fronts of the compartments (5) have respective compartment doors (16) adapted to heights of the fronts.

14. The control box arrangement as recited in claim 1, wherein a front door that extends over all of the compartments (5) is in front of the compartments (5), each of which can have a respective compartment door (16).

15. The control box arrangement as recited in claim 1, wherein a divider strip (15) with a U-shaped cross section is positioned in front of a front edge of the compartment-dividing floors (30), with an open side oriented toward the front and free ends of side legs positioned in a same plane as a front plane of the frame legs (11).

16. The control box arrangement as recited in 1, wherein the side wall sections (20) in an upper corner region close to a vertical edge has bent hook elements (32) oriented away from the compartment interior and have downward-oriented securing protrusions adapted to openings in the rows of fastening holes.

17. The control box arrangement as recited in claim 1, wherein in an upper edge region each of the side wall sections (20) is first bent diagonally inward and upward at an obtuse angle parallel to an edge and are then bent diagonally outward and upward.

18. The control box arrangement as recited in claim 1, wherein the side wall sections (20) have a horizontal arrangement of holes at least in a lower edge region.

19. The control box arrangement as recited in claim 1, wherein mounting angles (70) attach the compartment-dividing floor (30) along the side wall sections (20), the mounting angles have a vertical leg (71) and a horizontal leg (72) and are attached to the vertical frame legs (11), the vertical mounting rails and/or the side wall sections (20) with a respective compartment-dividing floor is fastened to the opposing horizontal legs (72) of the mounting angles (70).

20. The control box arrangement as recited in claim 1, wherein the compartment-dividing floors (30) extend in a depth direction to the mounting plates (40) and the side wall sections (20) extend to the plane of the mounting plates (40) and are attached to vertical mounting rails or extend in the depth direction to and are attached to the rear vertical frame legs.

21. The control box arrangement as recited in claim 1, wherein the compartment-dividing floors (30) have in a rear edge region a cutout (32) that is broken out or can be broken out, through which the vertical distributing rails with a cover that prevents them from being touched are routed.

22. The control box arrangement as recited in claim 1, further comprising a plurality of mounting angles each including a vertical leg attachable to one of the side wall sections or the vertical frame legs, and each including a horizontal leg extending from the vertical leg into the interior of the first or second control box and attachable to one of the horizontal compartment-dividing floors.

23. The control box arrangement as recited in claim 1, wherein a second plurality of the side wall sections encloses outer sides of the control box arrangement, and further comprising continuous side walls covering the second plurality of side walls.

24. A control box arrangement comprising:
a first control box including a first plurality of vertical frame legs;
a second control box including a second plurality of vertical frame legs and connected to the first control box;
each of the first control box and the second control box having an interior subdivided or subdividable into a plurality of cuboid compartments arranged one above the other, each of the plurality of compartments enclosed on all sides by vertical wall sections and horizontal compartment-dividing floors;
a plurality of the vertical wall sections forming a vertical wall section of both a first compartment of the first control box and a second compartment of the second control box;
the vertical frame each including rows of fastening holes to which the vertical wall sections are mounted; and the vertical wall sections including side wall sections, and rear wall sections embodied as mounting plates, wherein a height of each of the compartments is a multiple of a height of the side wall sections and the mounting plates.

25. The control box arrangement as recited in claim 24, wherein a bus bar compartment for a main rail system extends vertically over an entire height of the control box interior, positioned inside behind the compartments (5) in a depth direction of the control box arrangement.

* * * * *